(12) United States Patent
Zimmerer et al.

(10) Patent No.: US 11,767,921 B2
(45) Date of Patent: Sep. 26, 2023

(54) BALL VALVE

(71) Applicant: Val-Matic Valve & Manufacturing Corporation, Elmhurst, IL (US)

(72) Inventors: Doug Zimmerer, Winfield, IL (US); Timothy M. O'Shea, Palatine, IL (US)

(73) Assignee: Val-Matic Valve & Manufacturing Corporation, Elmhurst, IL (US)

( * ) Notice: Subject to any disclaimer, the term of this patent is extended or adjusted under 35 U.S.C. 154(b) by 0 days.

(21) Appl. No.: 17/408,818

(22) Filed: Aug. 23, 2021

(65) Prior Publication Data

US 2022/0065360 A1 Mar. 3, 2022

Related U.S. Application Data

(60) Provisional application No. 63/071,791, filed on Aug. 28, 2020.

(51) Int. Cl.
*F16K 5/06* (2006.01)
*F16K 5/20* (2006.01)

(52) U.S. Cl.
CPC .......... *F16K 5/0684* (2013.01); *F16K 5/0605* (2013.01); *F16K 5/0668* (2013.01); *F16K 5/0689* (2013.01); *F16K 5/204* (2013.01)

(58) Field of Classification Search
CPC .... F16K 5/0605; F16K 5/0668; F16K 5/0678; F16K 5/0684; F16K 5/0689; F16K 5/204; F16K 1/205; F16K 1/2261
See application file for complete search history.

(56) References Cited

U.S. PATENT DOCUMENTS

| 2,998,957 | A | * | 9/1961 | Vulliez | F16K 1/34 |
| | | | | | 251/86 |
| 3,572,370 | A | * | 3/1971 | Engle | F16K 5/204 |
| | | | | | 251/283 |
| 4,366,946 | A | | 1/1983 | Roark | |
| 5,069,240 | A | | 12/1991 | Kurkjian, Jr. | |
| 2013/0312847 | A1 | * | 11/2013 | Avdjian | F16K 5/205 |
| | | | | | 137/15.01 |
| 2015/0377366 | A1 | | 12/2015 | Hartman et al. | |
| 2021/0222779 | A1 | * | 7/2021 | Roppolo | F16K 5/204 |

FOREIGN PATENT DOCUMENTS

FR   1593350 A  *  5/1970

OTHER PUBLICATIONS

Machine English translation of FR1593350 (Year: 2022).*
DEZurik APCO Willamette, Willamette Ball and Cones Valves, Bulletin 2200/2600, Jul. 2011.

* cited by examiner

*Primary Examiner* — Hailey K. Do
(74) *Attorney, Agent, or Firm* — Greer, Burns & Crain, Ltd.

(57) ABSTRACT

A ball valve with a ball rotatably mounted within the housing. The ball is rotatable between an opened configuration, in which fluid flows through the ball, and a closed configuration, in which a ball seat engages a housing seat to prevent fluid from flowing through the ball valve. The ball may include one or more biasing members that urge the ball seat away from the ball and toward the housing seat. An engaging face of the ball seat may have a spherical or toroidal shape and an engaging face of the housing seat may have a conical shape. The ball seat may have up to six degrees of freedom related to the ball when the ball is in the closed configuration and the ball valve under pressure.

16 Claims, 5 Drawing Sheets

BALL VALVE

RELATED APPLICATIONS

This application claims priority to U.S. Provisional Patent Application Ser. No. 63/071,791 filed on Aug. 28, 2020, the entirety of which is incorporated herein by reference.

FIELD OF THE INVENTION

The present invention relates to a valve for controlling the flow of fluids therethrough. More specifically, the present invention relates to ball valves having metal seats.

BACKGROUND OF THE INVENTION

In the valve industry, many valves are equipped with a rubber seat. The rubber seat, typically mated against a metal seat, allows for drop-tight leakage and is usually the most cost-effective option. However, entirely metal-seated valves (herein referred to simply as "metal-seated valves"), in which a metal seat mates against another metal seat, are typically regarded as having a longer service life. For example, raw water or wastewater flow streams flowing through the valves may cut or otherwise damage rubber seats in the valve. Additionally, in some applications the fluid flowing through the valve is abrasive, corrosive, or otherwise not chemically compatible with typical rubber materials. Accordingly, metal-seated valves provide a solution to address such drawbacks and generally have a longer service life and require minimal maintenance compared with rubber-seated valves.

Many conventional metal-seated ball valves are disposed in a four (4) piece housing in which the ball is directly supported by large trunnions on the ball that prevent deflection of the ball when the valve sees a differential pressure across the seats in the closed position. The stiffness provided by the trunnions allows the valve to be assembled in a manner that reduces seating stress by controlling the position of the seats relative to one another. For low differential pressures, a small gap between the seats is set. For higher differential pressures, a larger gap is set to account for larger deflections. The gap is closed/reduced to zero when a differential pressure is applied to the valve. Because a gap was set before pressure is applied, when the two seats come in contact, they do not see the entire differential pressure load. As would be appreciated, if the gaps were set to zero with no pressure, when a high differential pressure is applied, the seats would scrape/gall/wear excessively.

However, the gap also creates difficulties testing the valve in a shop/manufacturing environment. A large gap (for example 0.010") can make it very difficult to for the valve seats to seal in a shop environment. Specifically, in a shop, the valve is typically filled with water from a hose at city line pressure and then pressurized to the working pressure with a low flow/high pressure pump. The pump must be able to pump faster than the leakage past the seats for pressure to build upstream of the valve seats. This might be practical and possible for small sized valve sizes, but for larger sized valves (up to 60" inside diameter or more), it is not possible to rely on the pump alone to build pressure and get the valve to seal. There are methods to get these large valves to seal with a large gap, but they are unreliable and time consuming.

In contrast to a trunnion-mounted ball valve, the ball of a shaft-mounted ball valve is supported by a shaft that normally allows a large deflection (an order of magnitude greater than trunnion-mounted) of the ball and shaft assembly when there is a differential pressure across the seats. A shaft-mounted ball valve is traditionally paired with a rubber seat, as the rubber is more forgiving of such large deflections and movements of the ball/shaft assembly. The rubber seat may be adjusted at zero/atmospheric pressure, and when a differential pressure is applied, the rubber will deform when the ball/shaft assembly deflects under load. This combination of setting rubber seats without applied pressure and being able to support high deflections as well, makes such shaft-mounted rubber-seated valves relatively easy to assemble and test reliably.

In traditional shaft-mounted ball valves, a metal seat design would not be used because the deflections/deformation are too large to be able to precisely set gaps between the seats and get the valve seats to seal/hold pressure in a shop environment. Additionally, if the gaps were set too small or at zero, then the entire differential pressure load is borne by the seats, resulting in high seat contact stress, extreme wear and high potential for galling/scraping.

Conventional metal-seated ball valves often provide two opposing radii for both the housing seat and ball seat. In other words, the two engaging surfaces or faces are both spherical or toroidal surfaces. While this geometry results in low leakage, it also has high contact stress which reduces the life of the seats. Alternatively, some ball valves have matching spherical seats where the housing seat and ball seat have the same radius. This style lowers the seat contact stress but requires the two seats to be lapped together to limit leakage past the seats.

Therefore, it would be desirable to provide a metal-seated ball valve that addresses one or more of these drawbacks.

SUMMARY OF THE INVENTION

A new ball valve has been invented which includes an adjustable metal ball seat. The ball seat may have a spherical or toroidal engaging face and a housing seat may have a conical engaging face. When the ball is in a closed configuration and the ball valve under pressure, the ball seat may have up to six degrees of freedom of movement. The present ball valve provides a seat that is easy to install and adjust, and that does not wear as easily.

Accordingly, in a first aspect of the present invention, the present invention may be generally characterized as providing a ball valve having a housing with an inlet, an outlet, and a housing seat, and a ball rotatably mounted within the housing. The ball has an aperture, a ball seat moveably retained on the ball, and at least one biasing member. The ball is configured to be rotated between an opened configuration, in which fluid is permitted to flow through the ball from the inlet, through the aperture, and out of the outlet, and a closed configuration, in which the ball seat engages the housing seat to prevent fluid from flowing through the ball valve. The at least one biasing member urges the ball seat away from the ball and toward the housing seat. The ball seat, the housing seat, or both may be metal. The ball valve may include a shaft mounting the ball in the housing. The ball seat may include an engaging face that has a spherical or toroidal shape. The housing seat may include an engaging face that has a conical shape. The ball seat may have up to six degrees of freedom of movement relative to the ball when the ball is in the closed configuration and the ball valve under pressure.

In another aspect, the present invention may be characterized, broadly, as providing a ball valve having a housing with an inlet, an outlet, and a housing seat, and a ball rotatably mounted to a shaft within the housing. The housing seat has an engaging face that has a conical shape. The ball includes an aperture, a ball seat, and a retaining ring adjustably securing the ball seat to the ball. The ball seat includes an engaging face that has a spherical or toroidal shape. The ball is configured to be rotated between an opened configuration, in which fluid is permitted to flow through the ball from the inlet, through the aperture, and out of the outlet, and a closed configuration, in which the engaging face of the ball seat engages the engaging face of the housing seat to prevent fluid from flowing through the ball valve. The ball seat and the housing seat are both metal. The ball seat may have up to six degrees of freedom of movement relative to the ball when the ball is in the closed configuration and the ball valve under pressure. The ball further may include at least one biasing member configured to urge the ball seat away from the ball and toward the housing seat.

In a further another aspect, the present invention may be characterized, generally, as providing a ball valve having a housing with an inlet, an outlet, and a housing seat having an engaging face, and a ball rotatably mounted within the housing. The ball has an aperture and a ball seat with an engaging face. The ball seat is adjustably secured to the ball. The ball is configured to be rotated between an opened configuration, in which fluid is permitted to flow through the ball from the inlet, through the aperture, and out of the outlet, and a closed configuration, in which the engaging face of the ball seat engages the engaging face of the housing seat to prevent fluid from flowing through the ball valve. The ball seat has at least one, and may have up to six, degrees of freedom of movement relative to the ball when the ball is in the closed configuration and the ball valve under pressure. The ball further may include at least one biasing member configured to urge the ball seat away from the ball and toward the housing seat. The ball seat, the housing seat, or both may be metal. The ball valve may further include a shaft mounting the ball in the housing. The engaging face of the ball seat may be a spherical or toroidal shape. The engaging face of the housing seat may be a conical shape.

These and other aspects and embodiments of the present invention will be appreciated by those of ordinary skill in the art based upon the following description of the drawings and detailed description of the preferred embodiments.

BRIEF DESCRIPTION OF THE DRAWINGS

The attached drawings will make it possible to understand how the invention can be produced and practiced, in which.

DETAILED DESCRIPTION OF THE PREFERRED EMBODIMENTS

As mentioned above, a new ball valve has been invented which includes an adjustable metal ball seat. The ball seat may have a spherical or toroidal engaging face and a housing seat may have a conical engaging face. When the ball is in a closed configuration and the ball valve under pressure, the ball seat may have at least one and up to six degrees of freedom of movement relative to the ball. The present ball valve provides a seat that is easy to install and adjust, and that does not wear as easily.

Accordingly, with reference the attached drawings, one or more embodiments of the present invention will now be described with the understanding that the described embodiments are merely preferred and are not intended to be limiting.

Figure 1:
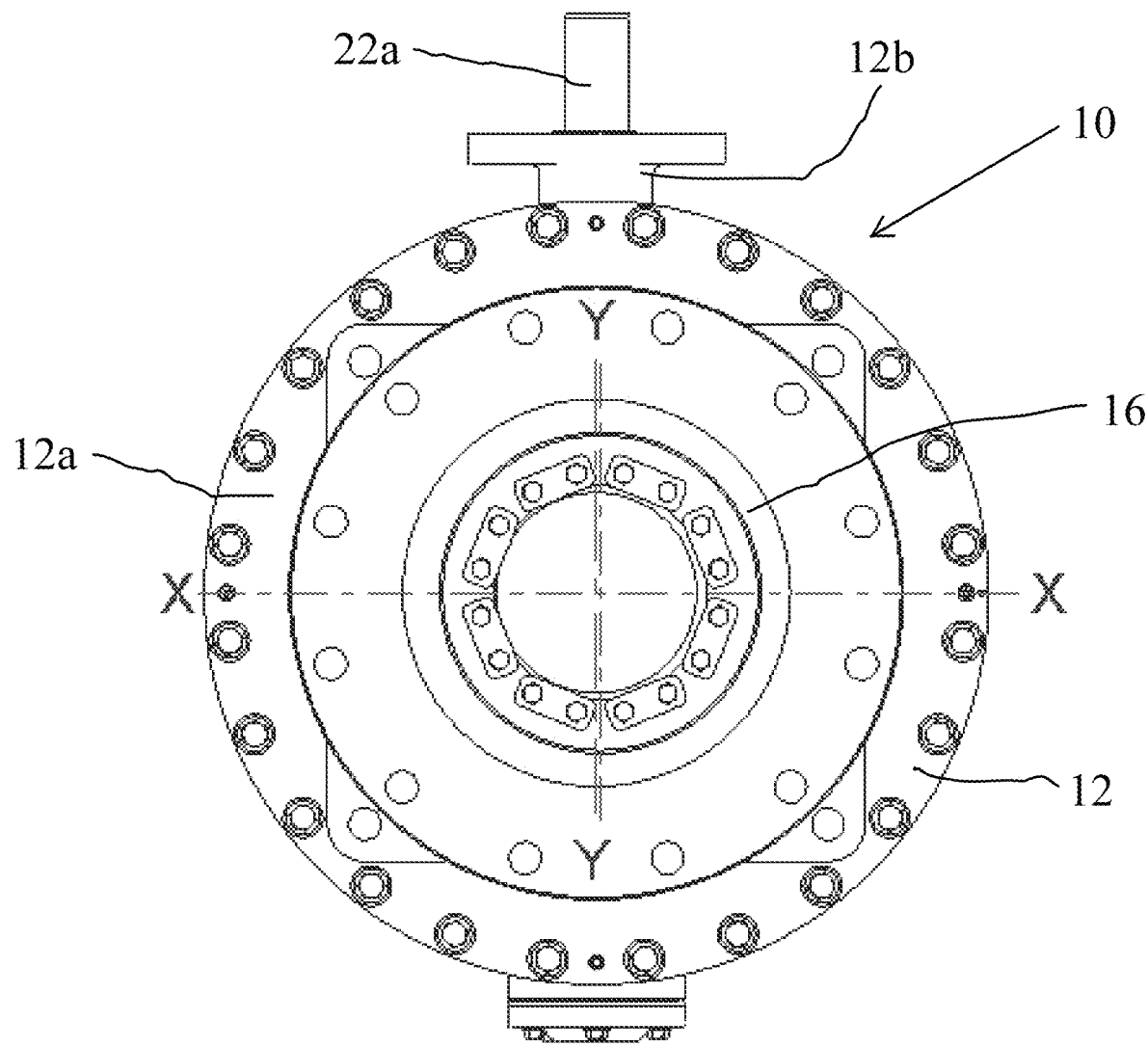
FIG. 1 is a front perspective view of a ball valve according to the present invention.
Figure 2:
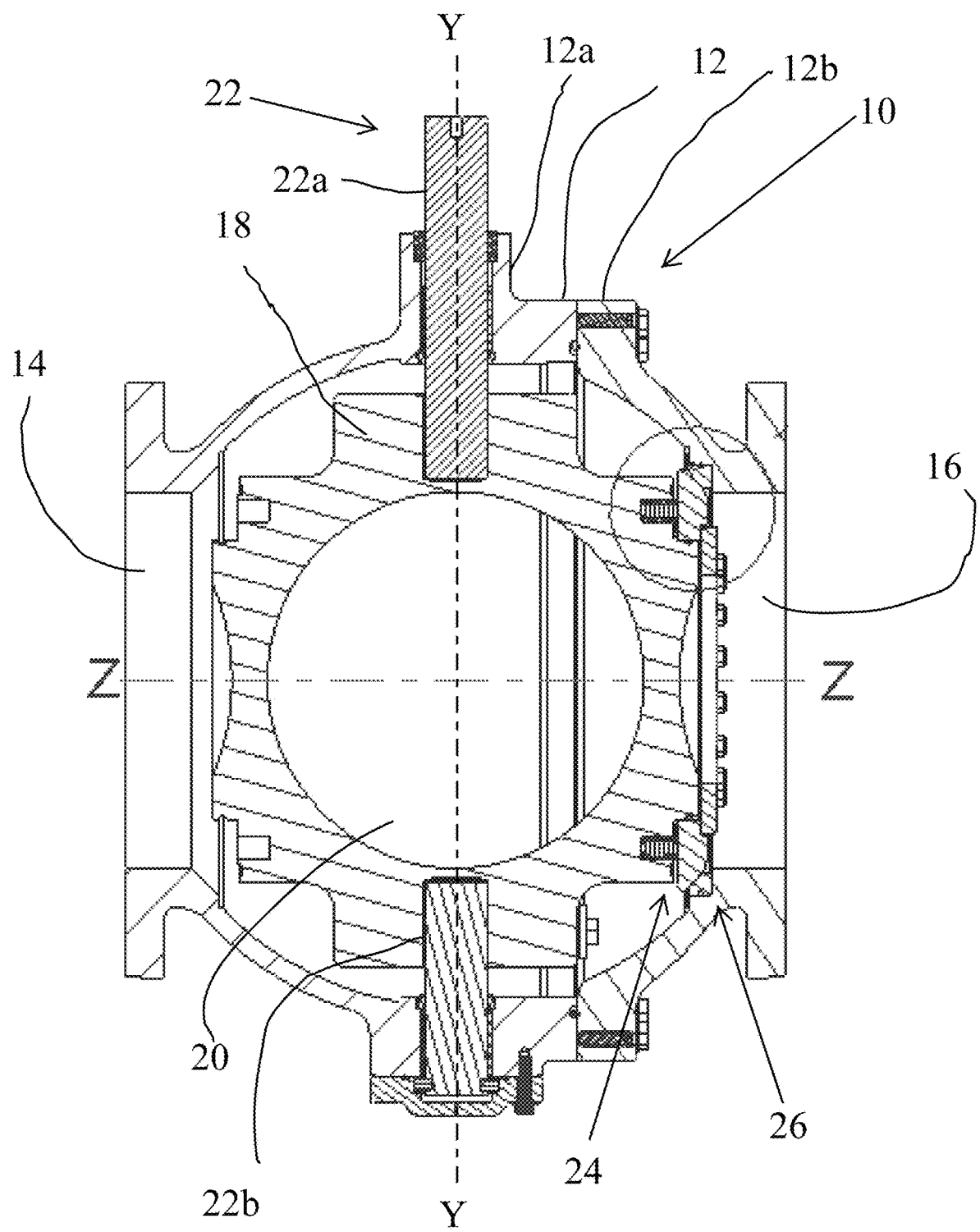
FIG. 2 is a side cutaway view of the ball valve shown in FIG. 1.

With reference to FIGS. 1 and 2, a new ball valve 10 is depicted. The ball valve 10 includes a housing 12 having a first end 14 and a second end 16. Depending on the configuration and arrangement of the ball valve 10, one of the ends 14, 16 is an inlet for a fluid and the other of the ends 14, 16 is an outlet for the fluid. Disposed inside of the housing 12 is a ball 18.

The ball 18 is pivotally mounted within and relative to the housing 12 about an axis Y-Y such that the ball 18 is configured to rotate between an opened configuration and a closed configuration. When the ball 18 is in the opened configuration, fluid is permitted to flow, generally along the Z axis, through the ball valve 10. More specifically, the fluid flows from the inlet end 14, 16, through an aperture 20 in the ball 18, and out of the outlet end 14, 16. When the ball 18 is in the closed configuration, the ball 18 prevents fluid from flowing through the ball valve 10.

In the depicted ball valve 10, the ball 18 is mounted in the housing 12 via a shaft 22 having upper and lower portions 22a, 22b. While the depicted ball valve 10 is a shaft-mounted ball valve, it is contemplated that the various aspects of the present invention could be utilized with a trunnion-mounted ball valve.

In order to prevent fluid flowing through the ball valve 10 when the ball 18 is in the closed configuration, the ball 18 includes a ball seat assembly 24 and the housing 12 includes a housing seat assembly 26.

Figure 3:
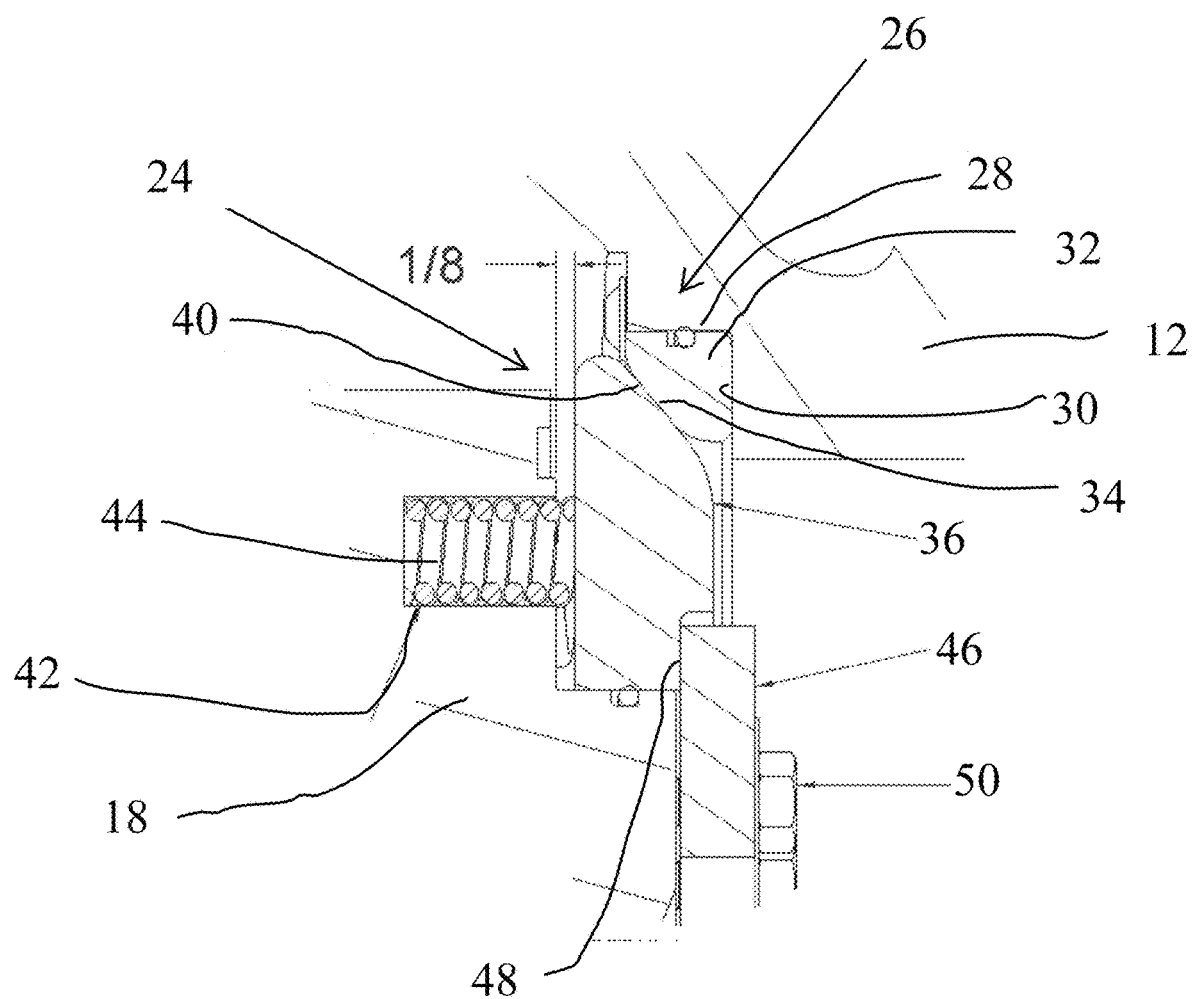
FIG. 3 is an enlarged view of a portion of FIG. 2 showing a closed configuration that is not under pressure.

Turning to FIG. 3, the ball seat assembly 24 and the housing seat assembly 26 are shown in greater detail. The housing seat assembly 26 includes an annular shoulder 28 on an inner surface 30 of the housing 12. A housing seat 32 is disposed in the annular shoulder 28. As will be appreciated, the housing seat 32 comprises a ring shape that includes an engaging face 34. In the preferred embodiment the engaging face 34 has a conical shape (meaning that the engaging face 34 is coincident with an outer surface of a cone). The housing seat 32 is preferably made from corrosion-resistant, hardened metal that may be any metal with surface hardening or hard plating like hard chrome plating or tungsten carbide plating. Alternatively, the housing seat 32 may be made from a corrosion-resistant, non-hardened metal that exhibit a high level of galling/wear resistance.

The ball seat assembly 24 includes a ball seat 36 that has a ring shape. The ball seat 36 preferably includes an engaging face 40 that has a spherical radius. In other words, the engaging face 40 of the ball seat 36 is coincident with the outer surface of a sphere.

The ball seat assembly 24 also includes a plurality of biasing members 42 configured to urge the ball seat 36 away from the ball 18. In the depicted embodiment, the biasing members 42 are compression springs 44. Additional contemplated biasing members 42 include wave springs and members formed from an elastomeric material, like rubber.

In order to retain the ball seat 36 on the ball 18, a retaining ring 46 engages a shoulder 48 on the ball seat 36. A plurality of fasteners 50 may be used to affix the retaining ring 46 to the ball 18.

As shown in FIG. 3, when the ball 18 in the closed configuration and the ball valve 10 is not under pressure, the positioning of the ball seat 36 relative to the housing seat 32 may be adjusted using the retaining ring 46 and the fasteners 50 until the engaging face 40 of the ball seat 36 makes contact with the engaging face 34 of the housing seat 32.

Figure 4:
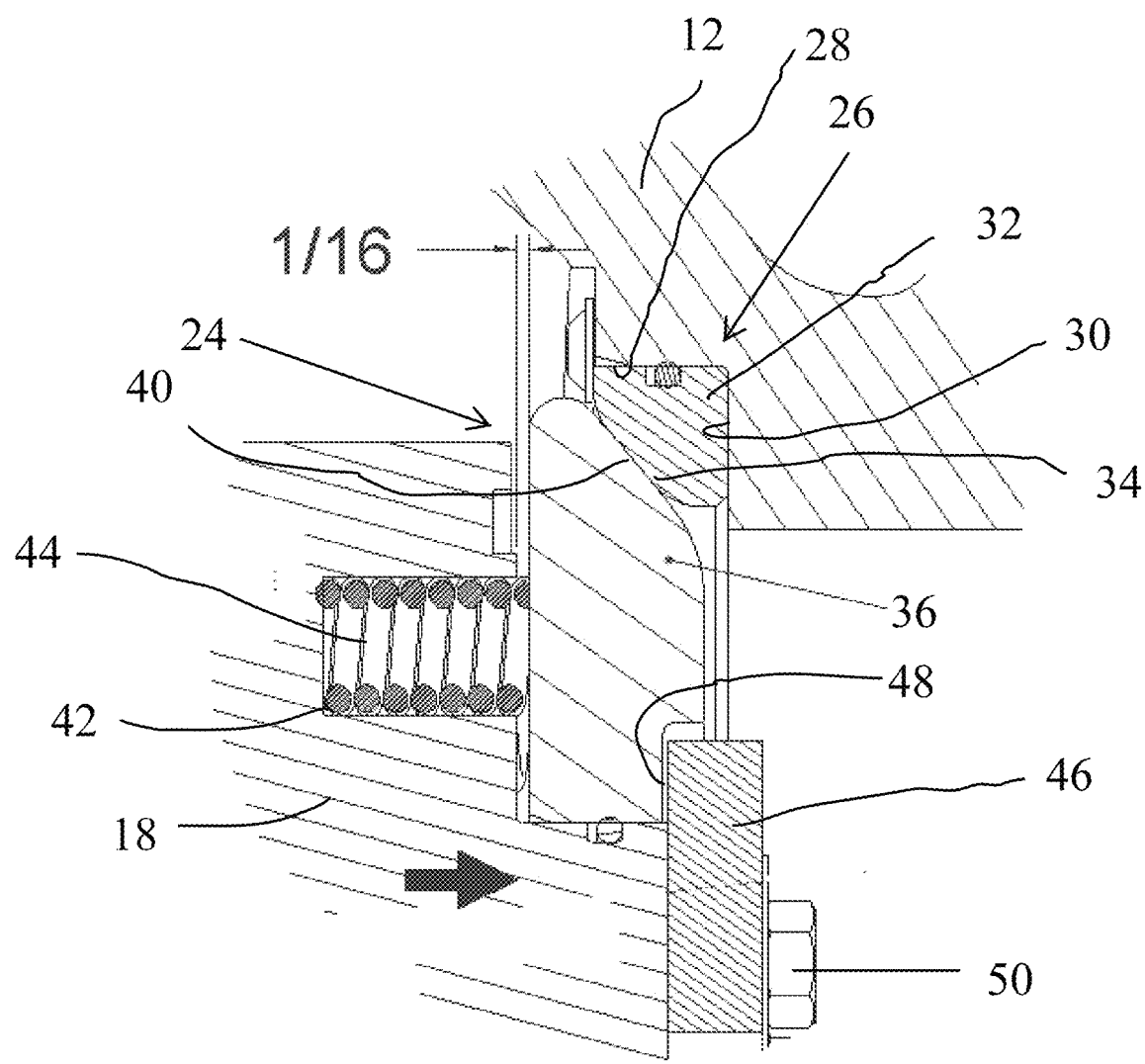
FIG. 4 is an enlarged view of a portion of FIG. 2 showing a closed configuration that is under pressure.

Turning to FIG. 4, when pressure inside the ball valve 10 is greater than the pressure on the opposite side of the seating assemblies (i.e., the right side of the ball valve 10 in FIG. 4), the ball 18 will deflect/move along a Z-axis towards the lower pressure side. This movement is a result of the pressure differential. In a shaft-mounted ball valve, as depicted in the FIGURES, this deflection can be relatively significant. For example, in a 12-inch valve (NPS), the ball 18 will move approximately $\frac{1}{16}$". To reduce the load/stress on the seats 32, 36 and extend their lifetime, the ball seat 36 moves relative to the ball 18 by compressing the biasing members 42.

Figure 5:
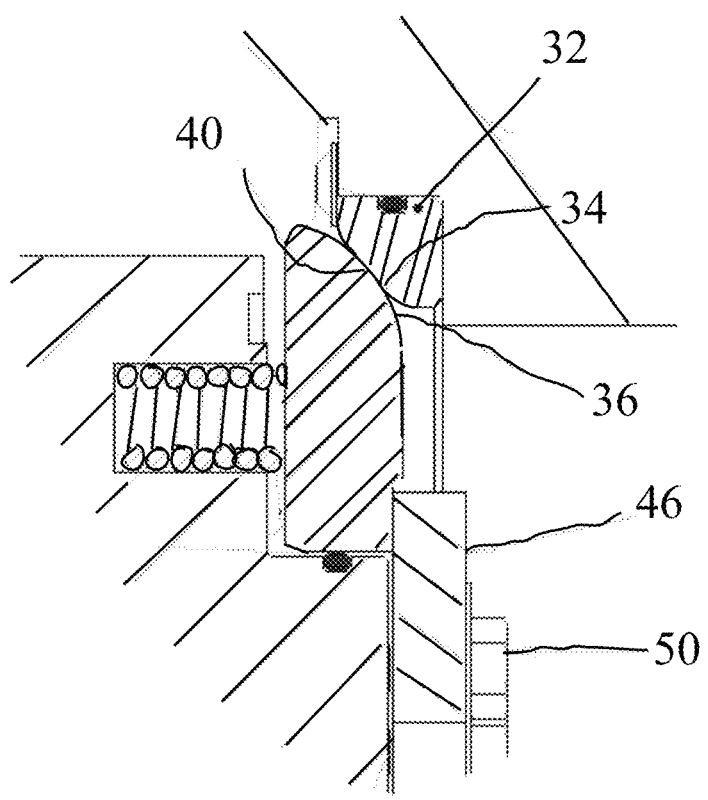
FIG. 5 is an enlarged view of a portion of a ball valve according to the present invention showing exaggerated engaging surfaces.

Turning to FIG. 5, in this embodiment of the present invention, the ball seat 36 preferably has an engaging face 40 that is a toroidal surface. In other words, the engaging face 40 of the ball seat 36 is coincident with the outer surface of a torus. The housing seat 32 has an engaging surface 34 that is a conical surface. It is thought that the combination of a spherical (FIG. 4) or toroidal (FIG. 5) surface (engaging face 40) mating with a cone (engaging surface 34) provides the best amount of seating stress/load to allow for low leakage and ease of manufacturing.

The ball seat 36 and housing seat 32 may be surface hardened using a process such as the Expanite® surface hardening process. As appreciated by those of ordinary skill in the art, the Expanite® treatment involves an effective removal of the protective oxide film on top of the stainless steel. This allows an incorporation of carbon or nitrogen atoms in the underlying metal within comparatively short treatment times. After the treatment is ended, the protective oxide layer is re-established automatically. The very high hardness of the resulting seating surfaces allows for higher contact stresses, preventing galling and decreasing wear on the seats 32, 36. Other hardening processes may be used. Further, the ball seat 36 and the housing seat 32 may be made from certain corrosion-resistant, non-hardened metallic materials that exhibit a high level of galling/wear resistance when paired with each other.

Finally, as noted above, the ball seat 36 is allowed to move along a Z-axis as described previously. This allows not only a reduction in seating stress, but the ability to set/adjust the seats for zero gap at atmospheric pressure for ease of testing/assembly. The clearance between the ball seat 36 and ball 18 in the present ball valve 10 also allows angular movement of the ball seat 36 (rotation around X-axis and Y-axis), as well as translational movement (along X-axis and along Y-axis) when pressurized in order for the ball seat 36 to fully seat against the housing seat 32.

For example, with respect to a 12-inch valve, while the clearance is small (0.003" to 0.007" diametrically), this allows for up 0.16° to 0.38° of angular movement of the ball seat 36 to account for any machining tolerances. The same gap allows for 0.003" to 0.007" of translation up/down (Y-axis) and left/right (X-axis), to account for eccentricity between the ball seat 36 and the housing seat 32. These five degrees of freedom of movement allow for adjustability that results in easy assembly and improved sealing at low/line pressure. This is in contrast to conventional valves that may include a threaded seat that can only be adjusted in and out (along Z-axis) and is therefore not self-aligning during assembly.

The ball seat 36 is also able to be rotated about the Z-axis during assembly because it is retained by the retaining ring 46. This constitutes a sixth degree of freedom of movement. It is contemplated that tapped holes (not shown) may be added to the ball seat 36 to assist in rotating the ball seat 36. This could be particularly advantageous if there is excess leaking because of a localized defect or wear. Rotating the ball seat 36 relative to the ball 18 might allow for reduced leakage as the two engaging surfaces 34, 40 will not make contact in the exact same line/area once rotated relative to one another.

As is apparent from the foregoing specification and description, the invention is susceptible of being embodied with various alterations and modifications which may differ particularly from those that have been described. It should be understood that we wish to embody within the scope of the patent warranted hereon all such modifications as reasonably and properly come within the scope of our contribution to the art.

The invention claimed is:

1. A ball valve comprising:
a housing having an inlet, an outlet, and a housing seat; and,
a ball rotatably mounted within the housing, the ball comprising an aperture, a ball seat moveably retained on the ball, and at least one biasing member,
wherein the ball is configured to be rotated between an opened configuration, in which fluid is permitted to flow through the ball from the inlet, through the aperture, and out of the outlet, and a closed configuration, in which the ball seat engages the housing seat to prevent fluid from flowing through the ball valve,
wherein the at least one biasing member urges the ball seat away from the ball and toward the housing seat, and,
wherein the ball seat has at least five degrees of freedom of movement relative to the ball when the ball is in the closed configuration and the ball valve is under pressure.

2. The ball valve of claim 1, wherein the ball seat, the housing seat, or both are metal.

3. The ball valve of claim 1, further comprising a shaft mounting the ball in the housing.

4. The ball valve of claim 1, wherein the ball seat comprises an engaging face that has a spherical or toroidal shape.

5. The ball valve of claim 1, wherein the housing seat comprises an engaging face that has a conical shape.

6. The ball valve of claim 1, wherein the ball seat has six degrees of freedom of movement relative to the ball when the ball is in the closed configuration and the ball valve is under pressure.

7. A ball valve comprising:
a housing having an inlet, an outlet, and a housing seat, wherein the housing seat comprises an engaging face that has a conical shape; and,
a ball rotatably mounted to a shaft within the housing, the ball comprising an aperture, a ball seat, and a retaining ring adjustably securing the ball seat to the ball,
wherein the ball seat comprises an engaging face that has a spherical or toroidal shape,
wherein the ball seat and the housing seat are metal, and,
wherein the ball is configured to be rotated between an opened configuration, in which fluid is permitted to flow through the ball from the inlet, through the aperture, and out of the outlet, and a closed configuration, in which the engaging face of the ball seat engages the engaging face of the housing seat to prevent fluid from flowing through the ball valve, wherein the ball seat has at least five degrees of freedom of movement relative to the ball when the ball is in the closed configuration and the ball valve is under pressure.

8. The ball valve of claim 7, wherein the ball further comprises at least one biasing member configured to urge the ball seat away from the ball and toward the housing seat.

9. The ball valve of claim 7, wherein the ball seat has six degrees of freedom of movement relative to the ball when the ball is in the closed configuration and the ball valve is under pressure.

10. A ball valve comprising:

a housing having an inlet, an outlet, and a housing seat having an engaging face; and, a ball rotatably mounted within the housing, the ball comprising an aperture and a ball seat having an engaging face, the ball seat adjustably secured to the ball, wherein the ball is configured to be rotated between an opened configuration, in which fluid is permitted to flow through the ball from the inlet, through the aperture, and out of the outlet, and a closed configuration, in which the engaging face of the ball seat engages the engaging face of the housing seat to prevent fluid from flowing through the ball valve, and, wherein the ball seat has at least five degrees of freedom of movement relative to the ball when the ball is in the closed configuration and the ball valve is under pressure.

11. The ball valve of claim 10, wherein the ball further comprises at least one biasing member configured to urge the ball seat away from the ball and toward the housing seat.

12. The ball valve of claim 10, wherein the ball seat, the housing seat, or both are metal.

13. The ball valve of claim 10, further comprising a shaft mounting the ball in the housing.

14. The ball valve of claim 10, wherein the engaging face of the ball seat comprises a spherical or toroidal shape.

15. The ball valve of claim 10, wherein the engaging face of the housing seat comprises a conical shape.

16. The ball valve of claim 10, wherein the ball seat has six degrees of freedom of movement relative to the ball when the ball is in the closed configuration and the ball valve is under pressure.

* * * * *